(12) United States Patent
Harman

(10) Patent No.: US 6,702,552 B1
(45) Date of Patent: Mar. 9, 2004

(54) IMPELLER HAVING BLADE(S) CONFORMING TO THE GOLDEN SECTION OF A LOGARITHMIC CURVE

(76) Inventor: Jayden David Harman, Research Vessel "PAX", Fremantle Fishing Boat Harbour, South Fremantle, W.A. 6162 (AU)

(*) Notice: Subject to any disclaimer, the term of this patent is extended or adjusted under 35 U.S.C. 154(b) by 0 days.

(21) Appl. No.: 10/130,946
(22) PCT Filed: Nov. 24, 2000
(86) PCT No.: PCT/AU00/01438
§ 371 (c)(1),
(2), (4) Date: May 24, 2002
(87) PCT Pub. No.: WO01/38697
PCT Pub. Date: May 31, 2001

(30) Foreign Application Priority Data

Nov. 25, 1999 (AU) .............................. PQ4243
Apr. 13, 2000 (AU) .............................. PQ6890

(51) Int. Cl.[7] .............................................. F04D 29/38
(52) U.S. Cl. ............ 416/223 R; 416/243; 416/DIG. 2; 416/19
(58) Field of Search .............................. 416/19, 223 R, 416/243, DIG. 2

(56) References Cited

U.S. PATENT DOCUMENTS

| | | | | |
|---|---|---|---|---|
| 1,919,250 A | * | 7/1933 | Olson ......................... | 416/238 |
| 2,165,808 A | | 7/1939 | Murphy ....................... | 103/115 |
| 3,081,826 A | * | 3/1963 | Loiseau ....................... | 416/238 |
| 3,082,695 A | | 3/1963 | Buschhorn ................... | 103/115 |
| 4,540,334 A | | 9/1985 | Stähle ......................... | 415/72 |
| 5,249,993 A | * | 10/1993 | Martin ......................... | 440/73 |
| 5,934,877 A | | 8/1999 | Harman ....................... | 416/223 |

FOREIGN PATENT DOCUMENTS

| | | |
|---|---|---|
| AU | 62946/96 | 2/1997 |
| EP | 0 598 253 | 5/1994 |
| RU | 431850 | 6/1974 |
| RU | 858896 | 8/1981 |

OTHER PUBLICATIONS

McLarty, W., et al., "Phi Geometry: Impeller & Propeller Design for Fluids Handling", Offshore Magazine, pp. 123 (and continued) (Oct. 1999).

Derwent Abstract Accession No. 89–157673/21, SU1437579 A (LENGD KALININ POLY), (Nov. 1988).

Derwent Abstract Accession No. K2273W/37, SU 431850 A (FISHING IND EXP), (Apr. 1975).

Derwent Abstract Accession 51960 E/25, SU 858896 A (ONATSKII P A), (Aug. 1981).

* cited by examiner

*Primary Examiner*—Ninh H. Nguyen
(74) *Attorney, Agent, or Firm*—Ladas & Parry

(57) ABSTRACT

A single or multi-bladed rotor for use with a fluid flow generator or reactor, the rotor comprising a central hub which is adapted to be mounted to a rotatable shaft, the rotor further comprises at least one radial blade mounted at one end to the hub, wherein the at least one blade has a fluid reactive face which has the configuration of a logarithmic curve substantially conforming to the golden section, i.e. the order of growth of the radius of the curve which is measured at equiangular radii is constant and conforms to the ratio of 5:8.

43 Claims, 7 Drawing Sheets

US 6,702,552 B1

IMPELLER HAVING BLADE(S) CONFORMING TO THE GOLDEN SECTION OF A LOGARITHMIC CURVE

FIELD OF THE INVENTION

This invention relates to a rotor and in particular a single or multi-bladed rotor. The rotor according to the invention may be one which is intended to induce a fluid flow or alternatively may be one which is intended to be influenced by a fluid flow, resulting in rotation of the rotor as a result of that influence. Examples of the application of the rotor according to the invention comprise use as a: fan blade which is used to generate an air flow; a turbine blade which is used to generate a fluid flow, an impeller for use in a pump or compressor, or one which is reactive to a fluid flow; or a propeller which may be used with watercraft and aircraft.

BACKGROUND ART

The invention comprises a development of the rotor which is disclosed in U.S. Pat. No. 5,934,877 which comprises a rotor which has a configuration which conforms generally to the curve of a logarithmic configuration substantially conforming to an equiangular spiral of the Golden Section which is also known as the Phi ratio. The content of U.S. Pat. No. 5,934,877 is incorporated herein by reference.

Rotors such as impellors, propellers turbine blades and fan blades have scarcely changed over the years and are relatively inefficient. In addition, it is a common characteristic of such fan blades that their use results in the generation of a considerable amount of noise and in a fluid flow from the rotor which is turbulent. Furthermore, where rotors are used in a liquid environment, if the rotors are caused to rotate too fast, this can result in cavitation on the surface and tips of the rotor which not only reduces the operational efficiency of the rotor but can result in destructive influences on the rotor and the surrounding housing associated with the rotor.

The discussion throughout this specification, of the background and prior art to the invention is intended only to facilitate an understanding of the present invention. It should be appreciated that the discussion is not an acknowledgement or admission that any of the material referred to was part of the common general knowledge in Australia as at the priority date of the application.

It is an object of this invention to provide a single or multi-bladed rotor which can react to or induce a fluid flow and whereby the usage of that rotor results in a reduction of the degree of extraneous turbulence and tip vortices exerted on the fluid in its passage past the rotor with the resultant energy loss and noise generation when compared to conventional rotors which are currently in use.

DISCLOSURE OF THE INVENTION

Accordingly, the invention resides in a single or multi-bladed rotor for use with a fluid flow generator or reactor, said rotor comprising a central portion which is adapted to be mounted to a rotatable shaft, the rotor further comprising at least one radial blade mounted at one end to the central portion, each blade having a leading edge and a trailing edge between its one end and its radially outer most extremity, said at least one blade having a fluid reactive face which has the configuration of at least one logarithmic curve substantially conforming to the Golden Section, the at least one blade having a remote face which is remote from the reactive face, said remote face also having the configuration of at least one logarithmic curve substantially conforming to the Golden Section, said trailing and/or leading edge of the rotor having a curvature corresponding to at least one logarithmic curve substantially conforming to the Golden Section.

According to a preferred feature of the invention the one blade is mounted to the central portion and the central portion supports a counterweight positioned to balance the rotor in use.

According to a preferred feature of the invention at least two blades are mounted to the central portion said blades being spaced angularly equidistant around the central portion.

According to a preferred feature of the invention the curvature of the reactive face is uni-dimensional. According to one embodiment the curvature of the reactive face according to the at least one logarithmic curve substantially conforming to the Golden Section is about an axis which is substantially radial to the axis. According to another embodiment the curvature of the reactive face according to the at least one logarithmic curve substantially conforming to the Golden Section is about an axis which is substantially tangential to the rotation path about said axis. According to another embodiment the curvature of the reactive face according to the at least one logarithmic curve substantially conforming to the Golden Section is about an axis which is substantially coaxial with or substantially parallel with said axis.

According to a preferred feature of the invention the curvature of the reactive face is bi-dimensional. According to one embodiment the curvature of the reactive face according to the at least one logarithmic curve substantially conforming to the Golden Section is about an axis which is substantially radial to the rotation path of the blade about said axis and an axis which is substantially tangential to the rotation path about said axis. According to another embodiment the curvature of the reactive face according to the at least one logarithmic curve substantially conforming to the Golden Section is about an axis which is substantially radial to the axis and an axis which is substantially coaxial with or substantially parallel with said axis. According to another embodiment the curvature of the reactive face according to the at least one logarithmic curve substantially conforming to the Golden Section is about an axis which is substantially tangential to the rotation path about said axis and an axis which is substantially coaxial with or substantially parallel with said axis.

According to a preferred feature of the invention the curvature of the reactive face is three dimensional. According to one embodiment the curvature of the reactive face according to the at least one logarithmic curve substantially conforming to the Golden Section is about an axis an axis which is substantially radial to the rotation path, an axis which is substantially tangential to the rotation path about said axis and an axis which is substantially coaxial with or substantially parallel with said axis.

According to a preferred feature of the invention the trailing edge of the rotor has a curvature corresponding to at least one logarithmic curve conforming to the Golden Section.

According to a preferred feature of the invention the leading edge of the rotor has a curvature corresponding to at least one logarithmic curve conforming to the Golden Section.

According to a preferred feature of the invention the leading edge and the trailing edge of the rotor has a curvature corresponding to at least one logarithmic curve conforming to the Golden Section.

According to a preferred feature of the invention the rotor comprises a three bladed rotor.

According to a preferred feature of the invention the rotor comprises a fan blade which is intended to induce or react to a gaseous flow past the rotor.

According to a preferred feature of the invention the rotor comprises an aircraft propeller.

According to a preferred feature of the invention the rotor comprises a watercraft propeller.

According to a preferred feature of the invention the rotor comprises a pump rotor.

According to a preferred feature of the invention the rotor comprises a turbine rotor.

According to a preferred feature of the invention the rotor comprises a mixer rotor.

According to a preferred feature of the invention the curvature of reactive face and remote face are of a substantially equivalent form.

According to a preferred feature of the invention the curvature of the remote face is uni-dimensional. According to one embodiment the curvature of the remote face according to the at least one logarithmic curve substantially conforming to the Golden Section is about an axis which is substantially radial to the axis. According to another embodiment the curvature of the remote face according to the at least one logarithmic curve substantially conforming to the Golden Section is about an axis which is substantially tangential to the rotation path about said axis. According to another embodiment the curvature of the remote face according to the at least one logarithmic curve substantially conforming to the Golden Section is about an axis which is substantially coaxial with or substantially parallel with said axis.

According to a preferred feature of the invention the curvature of the remote face is bi-dimensional. According to one embodiment the curvature of the remote face according to the at least one logarithmic curve substantially conforming to the Golden Section is about an axis which is substantially radial to the rotation path of the blade about said axis and an axis which is substantially tangential to the rotation path about said axis. According to another embodiment the curvature of the remote face according to the at least one logarithmic curve substantially conforming to the Golden Section is about an axis which is substantially radial to the axis and an axis which is substantially coaxial with or substantially parallel with said axis. According to another embodiment the curvature of the remote face according to the at least one logarithmic curve substantially conforming to the Golden Section is about an axis which is substantially tangential to the rotation path about said axis and an axis which is substantially coaxial with or substantially parallel with said axis.

According to a preferred feature of the invention the curvature of the remote face is three dimensional. According to one embodiment the curvature of the blades according to the at least one logarithmic curve substantially conforming to the Golden Section is about an axis an axis which is substantially radial to the rotation path, an axis which is substantially tangential to the rotation path about said axis and an axis which is substantially coaxial with or substantially parallel with said axis.

The invention will be more fully understood in the light of the following description of several specific embodiments.

BRIEF DESCRIPTION OF THE DRAWINGS

The description is made with reference to the accompanying drawings of which.

DETAILED DESCRIPTION OF SEVERAL EMBODIMENTS

Figure 1:
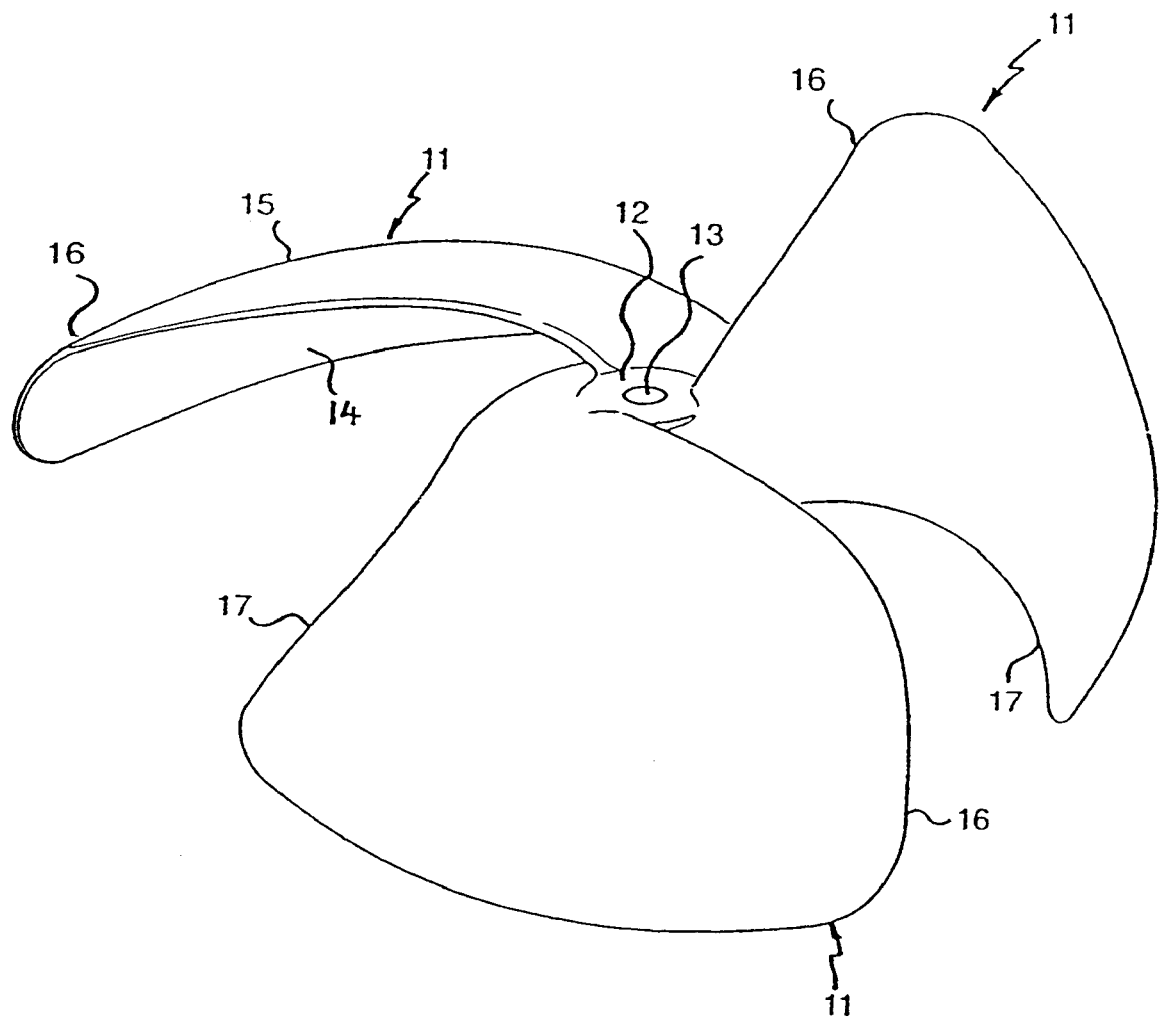
FIG. 1 is an isometric view of a rotor according to the first embodiment with the convex face uppermost.
Figure 2:
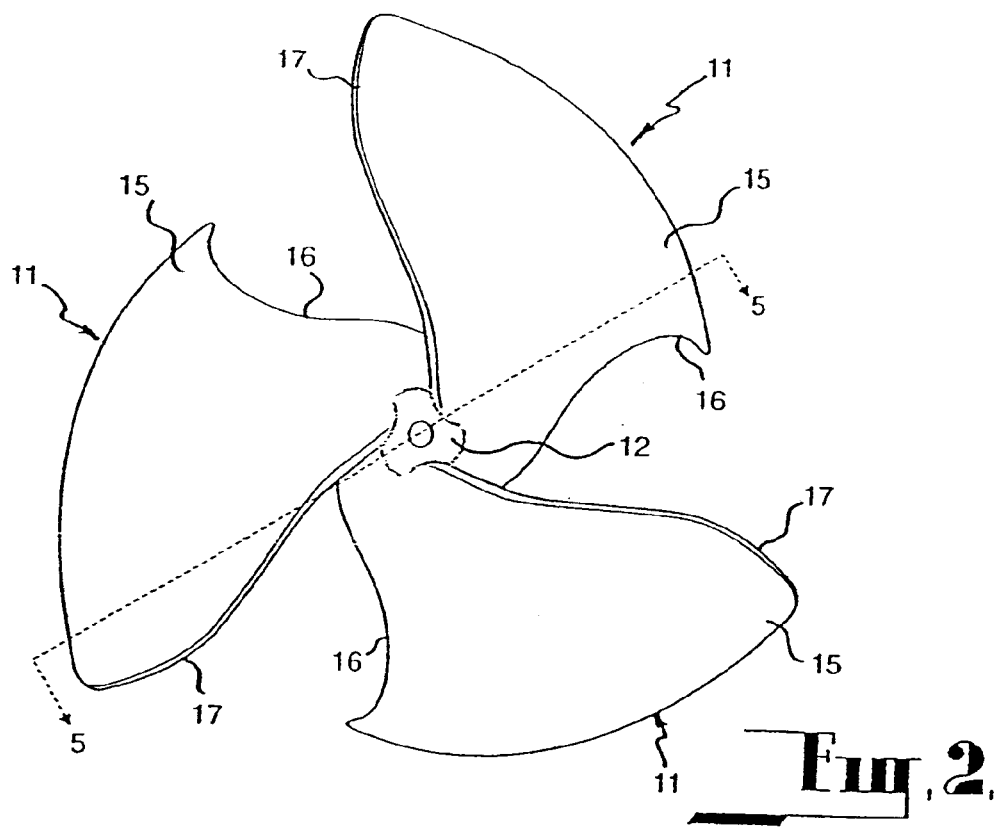
FIG. 2 is a plan view of the rotor according to the first embodiment in which the convex face of the rotor is uppermost.
Figure 3:
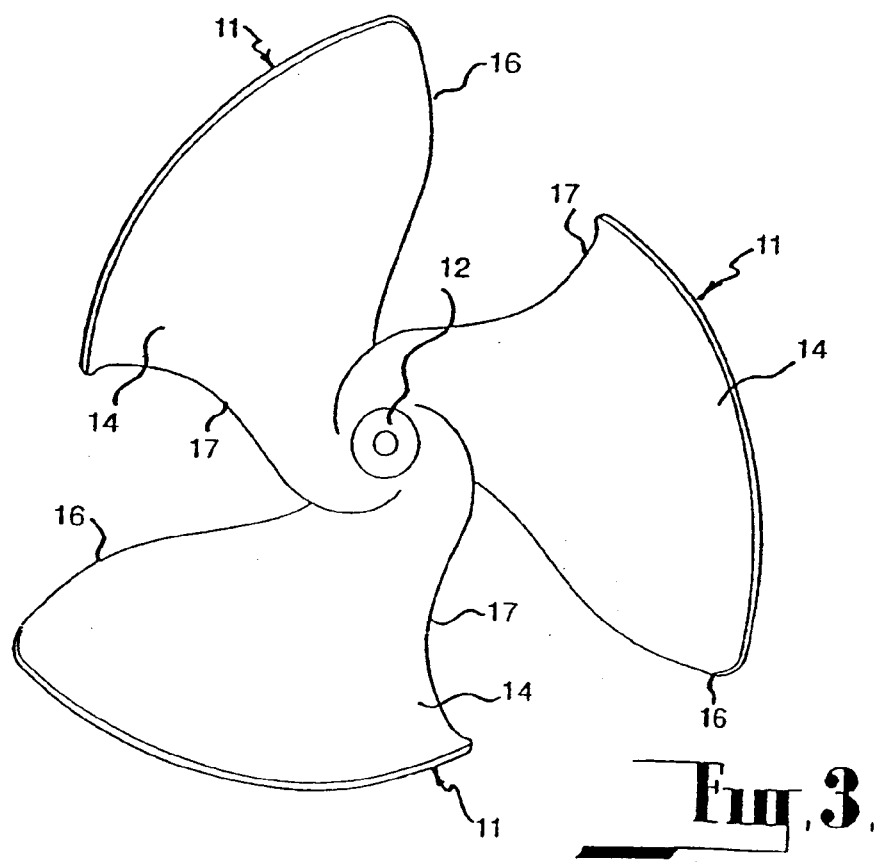
FIG. 3 is an inverted view of the rotor according to the first embodiment as shown at FIG. 2.
Figure 4:
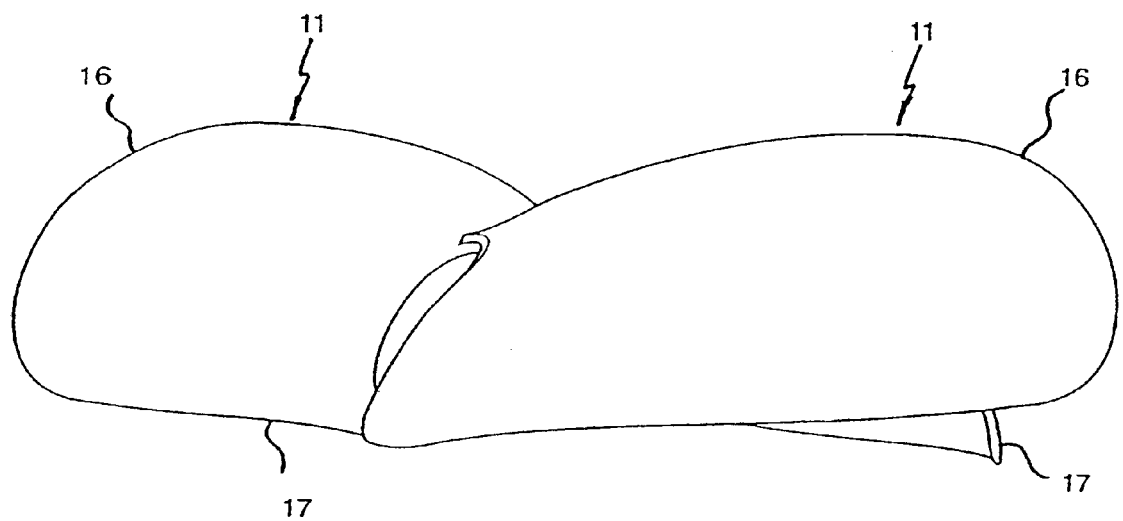
FIG. 4 is a side elevation of the rotor according to the first embodiment.
Figure 5:
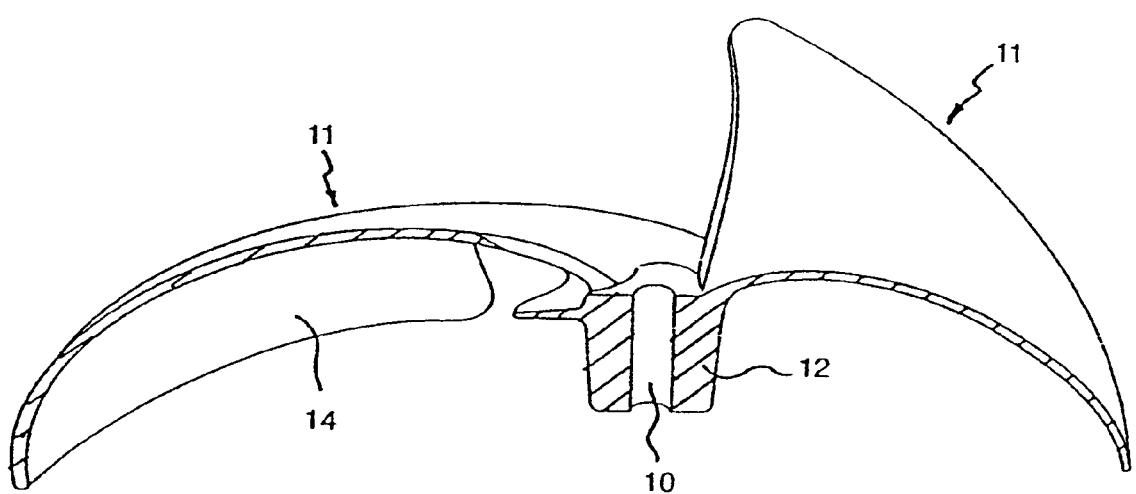
FIG. 5 is a sectional view along the line 5—5 of FIG. 2.

The first embodiment shown in FIGS. 1 to 6 of the drawings comprises a rotor which can be utilised as a fan blade in order to induce an air flow and in particular which can be used as the fan blade of an exhaust fan.

As shown in the drawings, the rotor comprises a hub (12) which supports a set of three radial blades (11). The hub (12) is formed with a central aperture (13) which is adapted to be mounted to a rotatable shaft which comprises, in the case of a fan blade intended to induce fluid flow, a drive shaft driven from a suitable motor. Each of the blades are formed with an internal reactive face (14) which is of a concave configuration and which has a three dimensional curvature whereby the curvature in each dimension is about an axis which is radial to the central axis of the rotor, an axis which is tangential to the central axis of the rotor and an axis which is coincidental or parallel to the central axis of the rotor. In each case the curvature is in accordance with a logarithmic curve conforming to the Golden Section. As a result, the blades (11) jointly define a generally concave face of the rotor.

In addition, each blade has a remote reactive face (15) which is remote from the reactive face (14) and which also has a three dimensional curvature of a convex nature whereby the curvature in each dimension conforms with a logarithmic curve according to the Golden Section, and whereby the curvature in each dimension is of the same form as the curvature of the reactive face (14) in each dimension. As a result, the remote faces (15) jointly define a generally convex surface of the rotor.

Each blade (11) is formed with a pair of generally radial edges (16) and (17) which due to the curvature of the blade are of differing lengths whereby one edge (16) has a greater length than the other edge (17). In addition, each edge has a curvature which conforms to a logarithmic curve conforming to the Golden Section.

Figure 6:
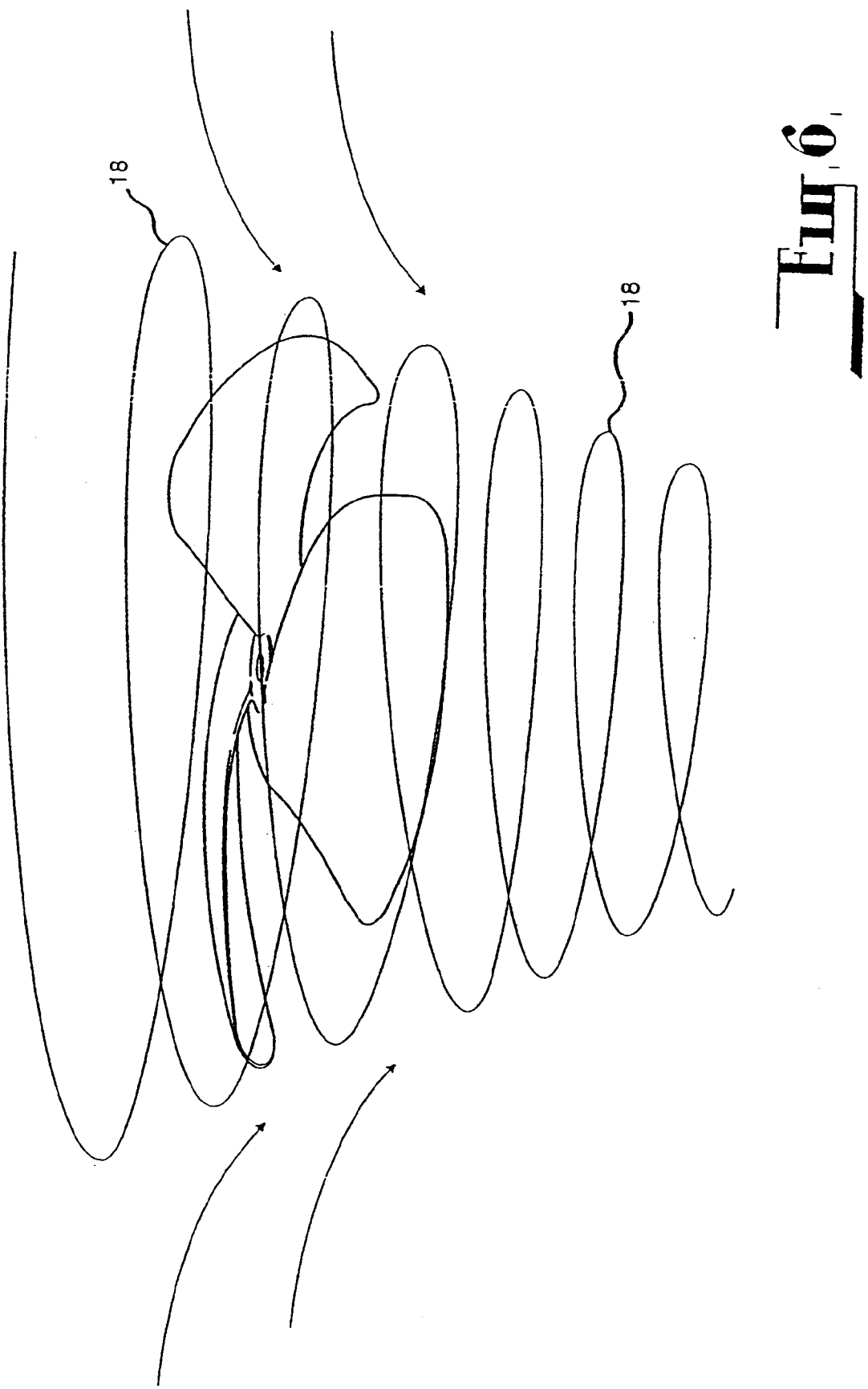
FIG. 6 is a schematic isometric view of the first embodiment illustrating the fluid flow that it is believed is generated by the rotation of the rotor.

The fan blade according to the first embodiment is intended to be used in an exhaust fan to induce a flow of air from one space to another whereby with rotation of the fan blade such that the one edge (16) forms the leading edge of each blade, fluid flow will be induced past the fan blade from the convex face to the concave face. Because of the curvature of the reactive face of each of the radial blades of the embodiment, the fan blade induces a vortical fluid flow in the air both as it approaches the fan blade and as it exhausts from the fan blade as illustrated at FIG. 6.

It has been found that in use of the first embodiment the rotation of the rotor generates a fluid flow through the rotor in which the flowing fluid maintains its own inertia and if the rotor is stopped the fluid flow will continue through the rotor for a period of time because of such inertia. It is believed that this is at least in part due to the circumstance that the use of the rotor of the first embodiment results in the generation of a fluid flow in which the pathway for the fluid flow though the rotor (as distinct from conventional rotors) is constant in its geometry from a position in advance of the entry to the rotor to a position beyond the exit from the rotor.

Examples of the First Embodiment

Figure 7:
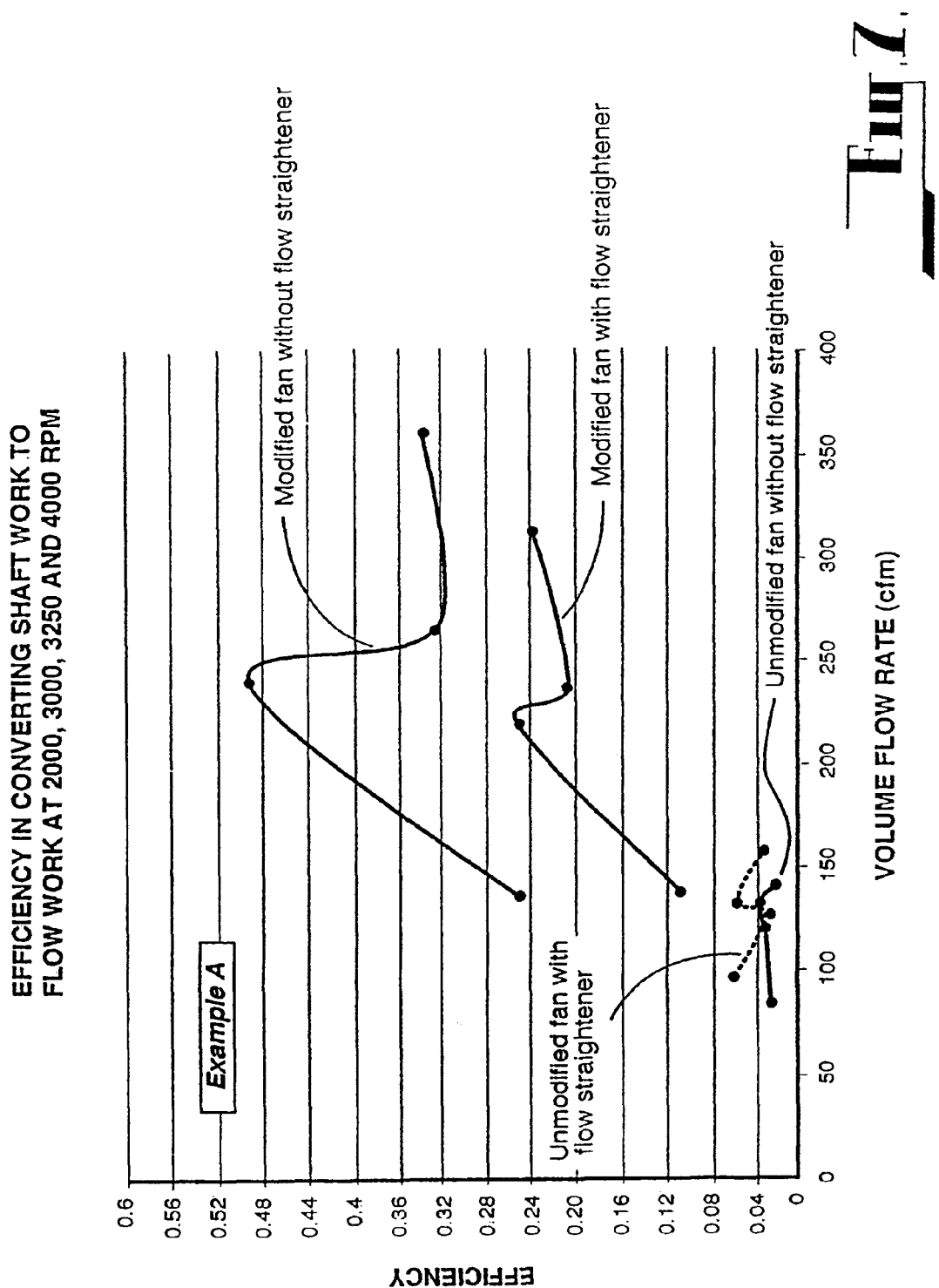
FIG. 7 is a graphical illustration of the performance of the rotor of the first embodiment when compared to the performance of a widely marketed conventional domestic exhaust fan blade.

A. An example of a fan blade according to the first embodiment has been constructed and used to replace the existing blade of an exhaust fan marketed under the name NUTONE by Nortec Inc. (exhaust fan model 686). The existing fan blade of that exhaust fan comprises a five bladed fan where the blades have a conventional configuration. The exhaust fan incorporating the existing fan blade was tested both with and without flow straightening means which was provided with the fan. In addition, the exhaust fan was modified by replacing the existing fan blade with a fan blade according to the embodiment and the modified exhaust fan was tested both with and without the conventional flow straightener. FIG. 7 illustrates the performance of each of the fan blades in a graphical form where the efficiency of the conventional exhaust fan and the modified exhaust fan is plotted against the volume flow rate generated by each exhaust fan where measures of the efficiency of the fan and the flow rate were determined at 2000 rpm, 3000 rpm, 3250 rpm and 4000 rpm.

|  | Fan with existing Rotor | Fan with example of embodiment |
| --- | --- | --- |
| Rpm | 2968 | 3150 |
| Current | 0.55 amp | .52 amp |
| Voltage | 117.6 volts | 118 volts |
| Power | 61.15 watts | 64.9 watts |
| Noise Frequency of 500–10,000 hz | 73 dB | 64 dB |
| Noise 32–10,000 hz | 75 dB | 68 dB |

As a result of utilisation of the rotor according to the first embodiment, the efficiency of the fan was increased significantly and the flow rate generated from the fan also increased dramatically.

B. In addition, a fan blade according to the first embodiment was utilised in an automotive cooling fan marketed under the name "Davies, Craig" by a company named Davies, Craig (model DCSL 10) as a result the following figures were determined.

|  | Fan with existing Rotor | Fan with example of embodiment |
| --- | --- | --- |
| Rpm | 2200 | 2200 |
| Current | 4.3 amp | 3.6 amp |
| Voltage | 11.2 volts | 12.8 volts |
| Power | 48 watts | 46 watts |
| Air Flow at 12 inches pressure | 8.5 mph (US) | 15 mph (US) |
| Noise Frequency of 500–10,000 hz | 79 dB | 64 dB |
| Noise 32–10,000 hz | 80 dB | 75 dB |

A second embodiment of the invention comprises a rotor of a similar form to that of the first embodiment where the other edge (17) comprises the leading edge of the rotor which is caused to rotate in the opposite direction to the rotor of the first embodiment.

A third embodiment of the invention comprises a rotor of a similar form to that of the first embodiment which is used as a propeller for use with watercraft. It is envisaged that the use of the third embodiment will enable the elimination or at least a reduction in the need for a surrounding shroud or duct which is often required with conventional propellers to improve their performance.

According to a fourth embodiment of the invention a rotor of a similar form to that of the first embodiment is used as the impeller of a fluid mixer.

According to a fifth embodiment of the invention a rotor of a similar form to that of the first embodiment is used as the impeller of a fluid pump.

According to a sixth embodiment of the invention a rotor of a similar form to that of the first embodiment is used as the impeller of a compressor.

According to a seventh embodiment of the invention a rotor of a similar form to that of the first embodiment is used as the turbine blade of a turbine.

Figure 8:
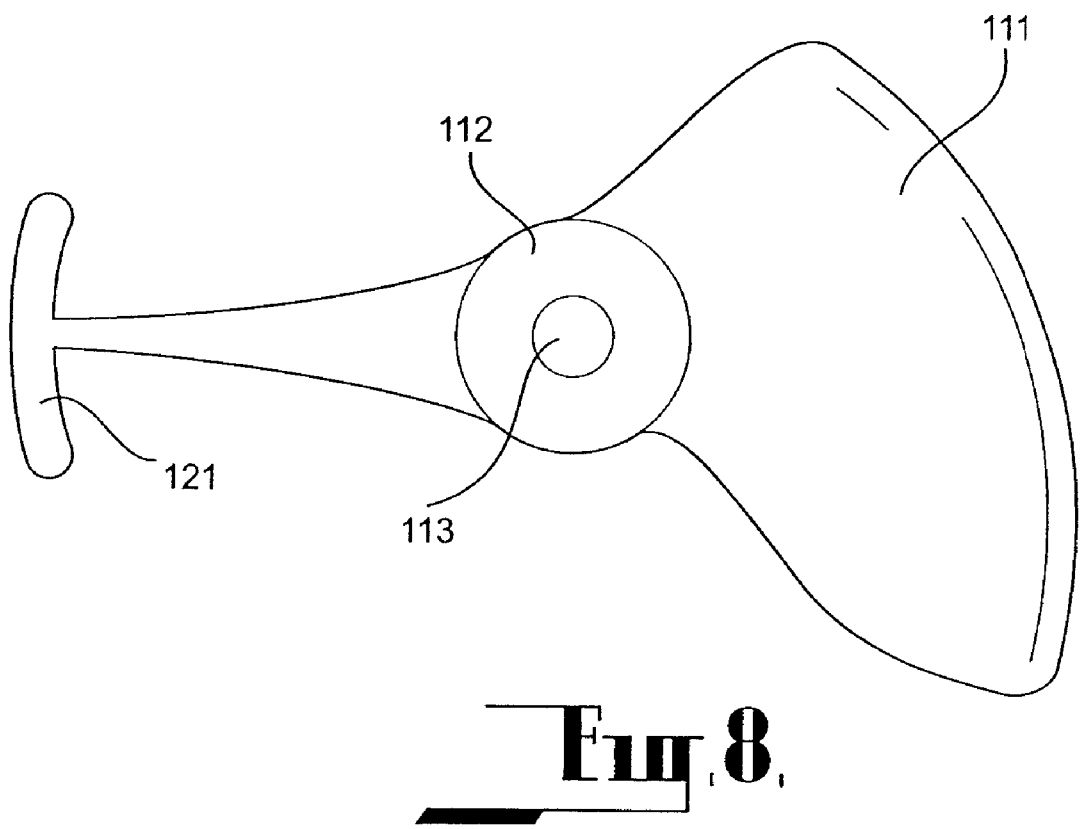
FIG. 8 is a plan view of the rotor according to the first embodiment in which the convex face of the rotor is uppermost.

According to an eighth embodiment, as illustrated in FIG. 8, a rotor is provided, comprising a single blade, only. As shown in the drawing, the rotor comprises a hub (112) which supports a single radial blade (111) and an opposed counterweight (121). The hub (112) is formed with a central aperture (113) which is adapted to be mounted to a rotatable shaft. The blade (111) is formed to conform to the constrains described in relation to the blades of the first embodiment. The counterweight (121) is designed to minimize drag while providing effective counterbalance for the single blade when rotating at operating speed.

As a result of testing of rotors according to at least some of the embodiments described above it appears that the blades of the rotor uniquely replicates and match the lines of vorticity of a singular vortex. As a result the rotor creates a homogeneous fluid flow structure which is then aided in its stability by the inertia of the resultant fluid field (i.e. the rotor creates a single vortex). Once rotating this singular vortex is both gyroscopic in nature and has a high rotating inertia. Conventional propellers do not achieve this and if they are suddenly stopped the propeller interferes with the fluid flow pattern it has created in the body of fluid. In comparison testing has shown that rotors according to the embodiment do not demonstrate such interference with the fluid flow when they are stopped and that the fluid follow will continue until the angular momentum induced in the fluid fades.

Throughout this specification (including the claims if present), unless the context requires otherwise, the word "comprise", or variations such as "comprises" or "comprising", will be understood to imply the inclusion of a stated integer or group of integers but not the exclusion of any other integer or group of integers. It should be appreciated that the scope of the present invention need not be limited to the particular scope of the embodiment described above.

The claims defining the invention are as follows:

1. A bladed rotor for use with a fluid flow generator or reactor, said rotor comprising a central portion which is adapted to be mounted to a rotatable shaft, the rotor further comprising at least one radial blade mounted at one end to the central portion, each blade having a leading edge and a trailing edge between its one end and its radially outer most extremity, said at least one blade having a fluid reactive face which has the configuration of at least one logarithmic curve substantially conforming to the Golden Section, the at least one blade having a remote face which is remote from the reactive face, said remote face also having the configuration of at least one logarithmic curve substantially conforming to the Golden Section, said trailing and/or leading edge of the rotor having a curvature corresponding to at least one logarithmic curve substantially conforming to the Golden Section.

2. A bladed rotor as claimed at claim 1 wherein the rotor comprises a single blade mounted to the central portion and the central portion supports a counterweight positioned to balance the rotor in use.

3. A bladed rotor as claimed at claim 1 wherein at least two blades are mounted to the central portion, said blades being spaced angularly equidistant around the central portion.

4. A bladed rotor as claimed in claim 1 wherein the curvature of the reactive face is uni-dimensional.

5. A bladed rotor as claimed at claim 4 wherein the curvature of the reactive face according to the at least one logarithmic curve substantially conforming to the Golden Section is about an axis which is substantially radial to the axis.

6. A bladed rotor as claimed at claim 4 wherein the curvature of the reactive face according to the at least one logarithmic curve substantially conforming to the Golden Section is about an axis which is substantially tangential to the rotation path about said axis.

7. A bladed rotor as claimed at claim 4 wherein the curvature of the reactive face according to the at least one logarithmic curve substantially conforming to the Golden Section is about an axis which is substantially coaxial with or substantially parallel with said axis.

8. A bladed rotor as claimed in claim 4 wherein the trailing edge of the rotor has a curvature corresponding to at least one logarithmic curve conforming to the Golden Section.

9. A bladed rotor as claimed in claim 4 wherein the leading edge of the rotor has a curvature corresponding to at least one logarithmic curve conforming to the Golden Section.

10. A bladed rotor as claimed in claim 1 wherein the curvature of the reactive face is bi-dimensional.

11. A bladed rotor as claimed at claim 10 wherein the curvature of the reactive face according to the at least one logarithmic curve substantially conforming to the Golden Section is about an axis which is substantially radial to the rotation path of the blade about said axis and an axis which is substantially tangential to the rotation path about said axis.

12. A bladed rotor as claimed at claim 10 wherein the curvature of the reactive face according to the at least one logarithmic curve substantially conforming to the Golden Section is about an axis which is substantially radial to the axis and an axis which is substantially coaxial with or substantially parallel with said axis.

13. A bladed rotor as claimed at claim 10 wherein the curvature of the reactive face according to the at least one logarithmic curve substantially conforming to the Golden Section is about an axis which is substantially tangential to the rotation path about said axis and an axis which is substantially coaxial with or substantially parallel with said axis.

14. A bladed rotor as claimed in claim 10 wherein the trailing edge of the rotor has a curvature corresponding to at least one logarithmic curve conforming to the Golden Section.

15. A bladed rotor as claimed in claim 10 wherein the leading edge of the rotor has a curvature corresponding to at least one logarithmic curve conforming to the Golden Section.

16. A bladed rotor as claimed in claim 1 wherein curvature of the reactive face is three dimensional.

17. A bladed rotor as claimed at claim 16 wherein the curvature of the reactive face according to the at least one logarithmic curve substantially conforming to the Golden Section is about an axis an axis which is substantially radial to the rotation path, an axis which is substantially tangential to the rotation path about said axis and an axis which is substantially coaxial with or substantially parallel with said axis.

18. A bladed rotor as claimed in claim 16 wherein the trailing edge of the rotor has a curvature corresponding to at least one logarithmic curve conforming to the Golden Section.

19. A bladed rotor as claimed in claim 16 wherein the leading edge of the rotor has a curvature corresponding to at least one logarithmic curve conforming to the Golden Section.

20. A bladed rotor as claimed in claim 19 wherein the curvature of the reactive face is uni-dimensional.

21. A bladed rotor as claimed in claim 19 wherein the curvature of the reactive face is bi-dimensional.

22. A bladed rotor as claimed in claim 19 wherein the curvature of the reactive face is three dimensional.

23. A bladed rotor as claimed in claim 1 wherein the trailing edge of the rotor has a curvature corresponding to at least one logarithmic curve conforming to the Golden Section.

24. A bladed rotor as claimed in claim 23 wherein the leading edge of the rotor has a curvature corresponding to at least one logarithmic curve conforming to the Golden Section.

25. A bladed rotor as claimed in claim 1 wherein the leading edge of the rotor has a curvature corresponding to at least one logarithmic curve conforming to the Golden Section.

26. A bladed rotor as claimed in claim 1 wherein the rotor comprises a three bladed rotor.

27. A bladed rotor as claimed in claim 1 wherein the rotor comprises a fan blade which is intended to induce or react to a gaseous flow past the rotor.

28. A bladed rotor as claimed in clam 1 wherein the rotor comprises an aircraft propeller.

29. A bladed rotor as claimed in claim 1 wherein the rotor comprises a watercraft propeller.

30. A bladed rotor as claimed in claim 1 wherein the rotor comprises a pump rotor.

31. A bladed rotor as claimed in claim 1 wherein the rotor comprises a turbine rotor.

32. A bladed rotor as claimed in claim 1 wherein the rotor comprises a mixer rotor.

33. A bladed rotor as claimed in claim 1 wherein the curvature of reactive face and remote face are of a substantially equivalent form.

34. A bladed rotor as claimed in claim 1 wherein the curvature of the remote face is uni-dimensional.

35. A bladed rotor as claimed at claim 34 wherein the curvature of the remote face according to the at least one logarithmic curve substantially conforming to the Golden Section is about an axis which is substantially radial to the axis.

36. A bladed rotor as claimed at claim 34 wherein the curvature of the remote face according to the at least one logarithmic curve substantially conforming to the Golden Section is about an axis which is substantially tangential to the rotation path about said axis.

37. A bladed rotor as claimed at claim 34 wherein the curvature of the remote face according to the at least one logarithmic curve substantially conforming to the Golden Section is about an axis which is substantially coaxial with or substantially parallel with said axis.

38. A bladed rotor as claimed in claim 1 wherein the curvature of the remote face is bi-dimensional.

39. A bladed rotor as claimed at claim 38 wherein the curvature of the remote face according to the at least one logarithmic curve substantially conforming to the Golden Section is about an axis which is substantially radial to the rotation path of the blade about said axis and an axis which is substantially tangential to the rotation path about said axis.

40. A bladed rotor as claimed at claim 38 wherein the curvature of the remote face according to the at least one logarithmic curve substantially conforming to the Golden Section is about an axis which is substantially radial to the axis and an axis which is substantially coaxial with or substantially parallel with said axis.

41. A bladed rotor as claimed at claim 38 wherein the curvature of the remote face according to the at least one logarithmic curve substantially conforming to the Golden Section is about an axis which is substantially tangential to the rotation path about said axis and an axis which is substantially coaxial with or substantially parallel with said axis.

42. A bladed rotor as claimed in claim 1 wherein the curvature of the remote face is three dimensional.

43. A bladed rotor as claimed at claim 42 wherein the curvature of the blades according to the at least one logarithmic curve substantially conforming to the Golden Section is about an axis an axis which is substantially radial to the rotation path, an axis which is substantially tangential to the rotation path about said axis and an axis which is substantially coaxial with or substantially parallel with said axis.

* * * * *